United States Patent
Kitajima et al.

(10) Patent No.: US 12,025,526 B2
(45) Date of Patent: Jul. 2, 2024

(54) DIFFERENTIAL PRESSURE DETECTION DEVICE

(71) Applicant: YAMASHIN-FILTER CORP., Kanagawa (JP)

(72) Inventors: Nobuyuki Kitajima, Kanagawa (JP); Nobuki Sasaki, Kanagawa (JP); Megumi Nomoto, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 684 days.

(21) Appl. No.: 17/245,911

(22) Filed: Apr. 30, 2021

(65) Prior Publication Data

US 2021/0246991 A1    Aug. 12, 2021

Related U.S. Application Data

(63) Continuation of application No. PCT/JP2019/043456, filed on Nov. 6, 2019.

(30) Foreign Application Priority Data

Nov. 16, 2018  (JP) ................. 2018-215339

(51) Int. Cl.
*G01L 9/14*    (2006.01)
*G01L 9/00*    (2006.01)

(52) U.S. Cl.
CPC .............. *G01L 9/14* (2013.01); *G01L 9/0089* (2013.01)

(58) Field of Classification Search
CPC ... G01L 9/0089; G01L 9/14; G01L 7/16–166; G01L 13/06
See application file for complete search history.

(56) References Cited

U.S. PATENT DOCUMENTS

| 2,016,586 | A | * | 10/1935 | Becker | G01L 17/00 73/711 |
| 2,038,928 | A | * | 4/1936 | Farley | G01L 7/16 73/744 |
| 5,437,241 | A | | 8/1995 | Rosenberg et al. | |
| 6,880,405 | B2 | * | 4/2005 | Mouhebaty | G01L 19/12 73/717 |

(Continued)

FOREIGN PATENT DOCUMENTS

JP    2007-211703 A    8/2007

OTHER PUBLICATIONS

International Search Report issued in PCT/JP2019/043456 dated Dec. 3, 2019 with English Translation (3 pages).

(Continued)

*Primary Examiner* — Justin N Olamit
(74) *Attorney, Agent, or Firm* — Nakanishi IP Associates, LLC

(57) ABSTRACT

A differential pressure measurement range is widened and differential pressure can be measured particularly during low differential pressure. A first spool facing a space in a high pressure side is lighter than a second spool facing a space in a low pressure side in a state where a magnet is provided. Urging force of a first elastic member that urges the first spool toward the space in the high pressure side is smaller than urging force of a second elastic member that urges the second spool toward the space in the high pressure side, and the first elastic member and the second elastic member are disposed in series.

11 Claims, 9 Drawing Sheets

(56) References Cited

U.S. PATENT DOCUMENTS

| | | | |
|---|---|---|---|
| 9,304,052 B2* | 4/2016 | Chou | G01L 7/163 |
| 11,187,604 B2* | 11/2021 | Mei | G01L 13/02 |
| 11,850,538 B2* | 12/2023 | Kitajima | B01D 29/606 |
| 2018/0113011 A1 | 4/2018 | Inoue et al. | |

OTHER PUBLICATIONS

Extended European Search Report issued in European Patent Application No. 19885163.6, dated Nov. 25, 2021 (9 pages).

* cited by examiner

DIFFERENTIAL PRESSURE DETECTION DEVICE

CROSS-REFERENCE TO RELATED APPLICATIONS

This application is a continuation application of International Patent Application No. PCT/JP2019/043456 filed on Nov. 6, 2019, which claims priority to Japanese Patent Application No. 2018-215339 filed on Nov. 16, 2018, the entire contents of which are incorporated by reference.

TECHNICAL FIELD

The present invention relates to a differential pressure detection device.

BACKGROUND ART

Patent Document 1 discloses a flow rate detection device that can perform accurate detection during a low flow rate (low differential pressure) by housing a movable body that moves by fluid pressure within a housing, urging the movable body in a direction opposing to the fluid pressure by using a non-linear spring, attaching a magnet to the movable body, and providing a magnetic sensor in the housing.

CITATION LIST

Patent Literature

Patent Document 1: JP 2007-211703 A

The cited Patent Document 1 uses an unequal pitch spring as the non-linear spring. When force is applied, a site having a narrow pitch of the unequal pitch spring first comes into close contact, the number of turns decreases, and a spring constant increases. Thus, the spring constant becomes unstable before the site having a narrow pitch comes into close contact. Accordingly, there is a concern that detection of differential pressure becomes unstable.

Additionally, as a method for enabling detection during low differential pressure, a method for increasing the number of turns of a normal coil spring (linear spring) without using the non-linear spring is also conceivable. However, when the number of turns increases, since the length of the coil spring and the closed height of the coil spring during non-compression increase, a sensitivity range of the magnetic sensor cannot be used effectively, and there is a concern that accuracy of detection of differential pressure decreases.

The present invention has been made in view of such circumstances, and an object of the present invention is to provide a differential pressure detection device in which a differential pressure measurement range is widened and differential pressure can be measured particularly during low differential pressure.

SUMMARY OF INVENTION

A differential pressure detection device according to one or more embodiments of the present invention is a differential pressure detection device configured to detect differential pressure that is a pressure difference between a high pressure side and a low pressure side. The differential pressure detection device includes a case having a substantially cylindrical shape and including a sliding cavity open to a first end that is one end face, a spool provided inside the sliding cavity, the spool being movable along a center axis of the sliding cavity inside the sliding cavity and dividing the sliding cavity into a space in the low pressure side and a space in the high pressure side, an elastic member provided inside the sliding cavity, and a magnetic field detection element provided inside the case. The spool includes a first spool provided with a magnet, and a second spool having a diameter substantially identical to an inner diameter of the sliding cavity and sliding inside the sliding cavity, the first spool is provided to face the space in the high pressure side, and the second spool is provided to face the space in the low pressure side, the elastic member includes a first elastic member provided in the first spool and configured to urge the first spool toward the space in the high pressure side, and a second elastic member provided in the second spool and configured to urge the second spool toward the space in the high pressure side, the magnetic field detection element is provided opposite to the magnet with a bottom surface of the sliding cavity interposed between the magnetic field detection element and the magnet, the first spool is lighter than the second spool in a state where the magnet is provided, urging force of the first elastic member is smaller than urging force of the second elastic member, and the first elastic member and the second elastic member are disposed in series.

According to the differential pressure detection device according to one or more embodiments of the present invention, the first spool facing the space in the high pressure side is lighter than the second spool facing the space in the low pressure side in a state where the magnet is provided. The urging force of the first elastic member that urges the first spool toward the space in the high pressure side is smaller than the urging force of the second elastic member that urges the second spool toward the space in the high pressure side, and the first elastic member and the second elastic member are disposed in series. Accordingly, a differential pressure measurement range is widened, and differential pressure can be measured particularly during low differential pressure.

Here, a diameter of the first spool may be substantially identical to the inner diameter of the sliding cavity, and the first spool may slide inside the sliding cavity. In this way, the first spool is made light and the pressure receiving area of the first spool is increased, and thus a differential pressure measurement range is widened, and measurement of lower differential pressure can be performed.

Here, the second spool may include a stopper configured to restrict movement of the first spool in a direction toward the first end, the second spool may include a hole passing through the second spool along the center axis, and the first spool may cover the hole in a state where the first spool abuts on the stopper. Accordingly, the spool can move smoothly inside the sliding cavity.

Here, the second spool may include a cylindrical portion having a substantially cylindrical shape and including an outer peripheral surface sliding with the sliding cavity, the cylindrical portion may protrude toward the bottom surface, and the first spool may be provided inside the cylindrical portion, and may slide along an inner peripheral surface of the cylindrical portion. Accordingly, the first spool can be miniaturized and made lightweight, and even when differential pressure is small, differential pressure can be measured accurately.

Here, the spool may further include a third spool provided between the first spool and the second spool, the spool may divide the sliding cavity into a space in the low pressure side, a space in the high pressure side, and a space between the space in the low pressure side and the space in the high pressure side, the elastic member may further include a third elastic member provided in the third spool and configured to urge the third spool toward the space in the high pressure side, and urging force of the third elastic member may be smaller than the urging force of the second elastic member. Accordingly, the spool and the elastic member are further formed in multiple stages, and a differential pressure measurement range can further be widened.

According to one or more embodiments of the present invention, a differential pressure measurement range is widened, and differential pressure can be measured particularly during low differential pressure.

DESCRIPTION OF EMBODIMENTS

Hereinafter, embodiments of the present invention will be described in detail with reference to the drawings. A differential pressure detection device according to the present invention is provided in a filtration device, a valve, or the like, and detects differential pressure that is a pressure difference between a high pressure side and a low pressure side.

First Embodiment

Figure 1:
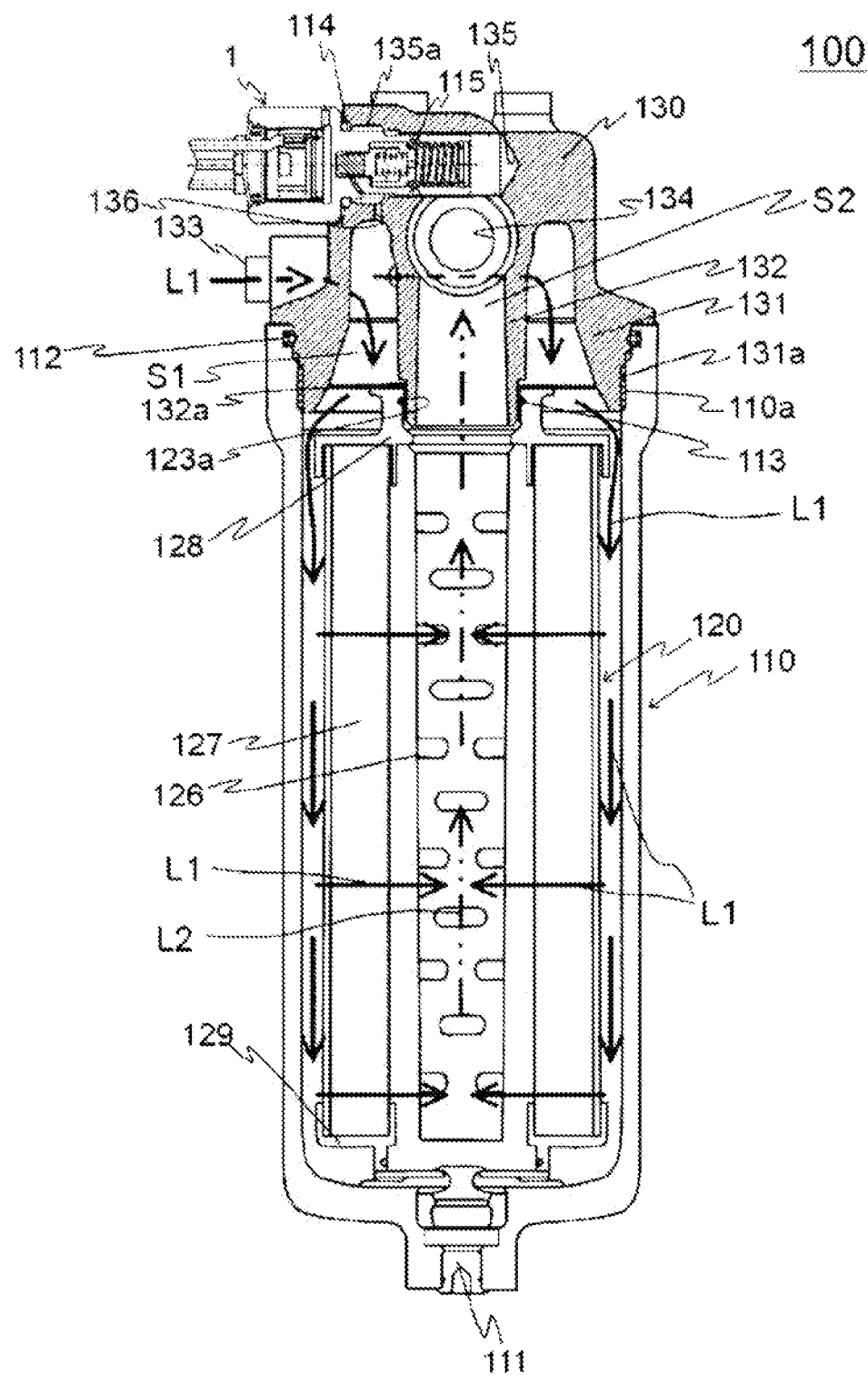
FIG. 1 is a view schematically illustrating a filtration device 100 provided with a differential pressure detection device 1 according to a first embodiment of the present invention.

FIG. 1 is a view schematically illustrating a filtration device 100 provided with a differential pressure detection device 1 according to a first embodiment of the present invention. The filtration device 100 removes dust and the like in liquid such as oil and water, and is incorporated, for example, in a hydraulic circuit of heavy machinery or the like including a hydraulic actuator. Note that in FIG. 1, hatching that indicates a cross section is partly omitted.

The filtration device 100 mainly includes a housing 110, a filter element 120, and a head 130.

The housing 110 is a member having a substantially bottomed cylindrical shape including one end substantially closed, and the other end open. A lower end of the housing 110 is provided with a drain 111. Note that the drain 111 is not essential.

An opening of the housing 110 is attached to the head 130. When the housing 110 is attached to the head 130, the filter element 120 is attached to a central tube 132 (described in detail below) of the head 130. Accordingly, the filter element 120 is housed inside the housing 110.

The filter element 120 mainly includes an inner tube 126, a filtration member 127, and plates 128 and 129 provided in both ends of the filtration member 127, respectively. The inner tube 126 is a member having a substantially hollow cylindrical shape including both ends open, and is formed by using a material having high corrosion resistance (for example, a resin or metal).

The filtration member 127 has a substantially hollow cylindrical shape having the thickness in the radial direction. The filtration member 127 is formed by pleating filter paper having a sheet-like shape and formed by using a synthetic resin, paper, or the like, and connecting both ends of the filter paper pleated to roll the filter paper.

One end (an end in the upper side in FIG. 1) of the filtration member 127 is provided with the plate 128, and the other end (an end in the lower side in FIG. 1) of the filtration member 127 is provided with the plate 129. The plate 128 and the plate 129 are members each having a substantially bottomed cylindrical shape, and are formed by using a material having high corrosion resistance.

The plate 128 is provided in the upper end of the filtration member 127. The central tube 132 (described in detail below) of the head 130 is inserted into the plate 128. A sealing member 113 (for example, an O-ring) is provided between the plate 128 and the central tube 132. The plate 128 and the central tube 132 are sealed by the sealing member 113 such that liquid does not leak outside between the plate 128 and the central tube 132. Additionally, since the plate 128 is provided with the inner tube 126, when the central tube 132 is inserted into the plate 128, an internal space of the inner tube 126 communicates with an internal space of the central tube 132.

The head 130 mainly includes a body 131, the central tube 132, an inflow path 133, an outflow path 134, and a mounting cavity 135.

The body 131 is a member having a substantially bottomed cylindrical shape, and is formed by using a material having high corrosion resistance. An external thread portion 131a is formed in an outer periphery of the vicinity of an open end of the body 131. When the external thread portion 131a is threadedly engaged with an internal thread portion 110a formed in an inner periphery of the housing 110, the housing 110 is attached to the head 130.

A sealing member 112 (for example, an O-ring) is provided between the housing 110 and the head 130. The housing 110 and the head 130 are sealed by the sealing member 112 such that liquid does not leak outside between the housing 110 and the head 130.

The central tube 132 is a member having a substantially cylindrical shape, and is integrally formed with the body 131. The central tube 132 protrudes from a substantially center of a bottom surface of the body 131 in the same direction as the direction of a side surface of the body 131. A stepped portion 132a to be inserted into a hollow portion 123a of the plate 128 is formed in an outer peripheral surface of the central tube 132.

The inflow path 133 and the outflow path 134 are substantially tubular. A space S1 formed by the side surface of the body 131 and the central tube 132 (a space outside the central tube 132) communicates with the inflow path 133. Additionally, a space S2 inside the central tube 132 communicates with the outflow path 134.

Among hydraulic oils, a hydraulic oil L1 to be filtered is fed to the filtration device 100 via the inflow path 133. The hydraulic oil L1 (see a solid line arrow in FIG. 1) flows into the housing 110, and is subsequently filtered by the filtration member 127 to flow out to the inside of the inner tube 126. Additionally, a hydraulic oil L2 that has been filtered and flowed out to the inside of the inner tube 126 (see a two-dot chain line arrow in FIG. 1) is discharged to the outside of the filtration device 100 through the outflow path 134.

The mounting cavity 135 is formed in the vicinity of the bottom surface of the body 131. The differential pressure detection device 1 is provided in the mounting cavity 135. An internal thread portion 135*a* is formed in a side surface of the mounting cavity 135. When an external thread portion 16 (see FIG. 2) formed in the differential pressure detection device 1 is threadedly engaged with the internal thread portion 135*a*, the differential pressure detection device 1 is attached to the head 130.

Sealing members 114 and 115 (for example, O-rings) are provided between the mounting cavity 135 and the differential pressure detection device 1. The mounting cavity 135 and the differential pressure detection device 1 are sealed by the sealing members 114 and 115 such that liquid does not leak outside between the mounting cavity 135 and the differential pressure detection device 1.

The vicinity of a bottom portion of the mounting cavity 135 communicates with the outflow path 134, that is, the space S2. Since a bottom surface of the differential pressure detection device 1 is open, the space S2 communicates with a first cavity 121 (described in detail below) inside the differential pressure detection device 1.

Additionally, the internal thread portion 135*a* of the mounting cavity 135 communicates with the space S1 via a hole 136. The space S1 communicates with a second cavity 122 (described in detail below) inside the differential pressure detection device 1 via a hole 15 (described in detail below) formed in the differential pressure detection device 1.

Figure 2:
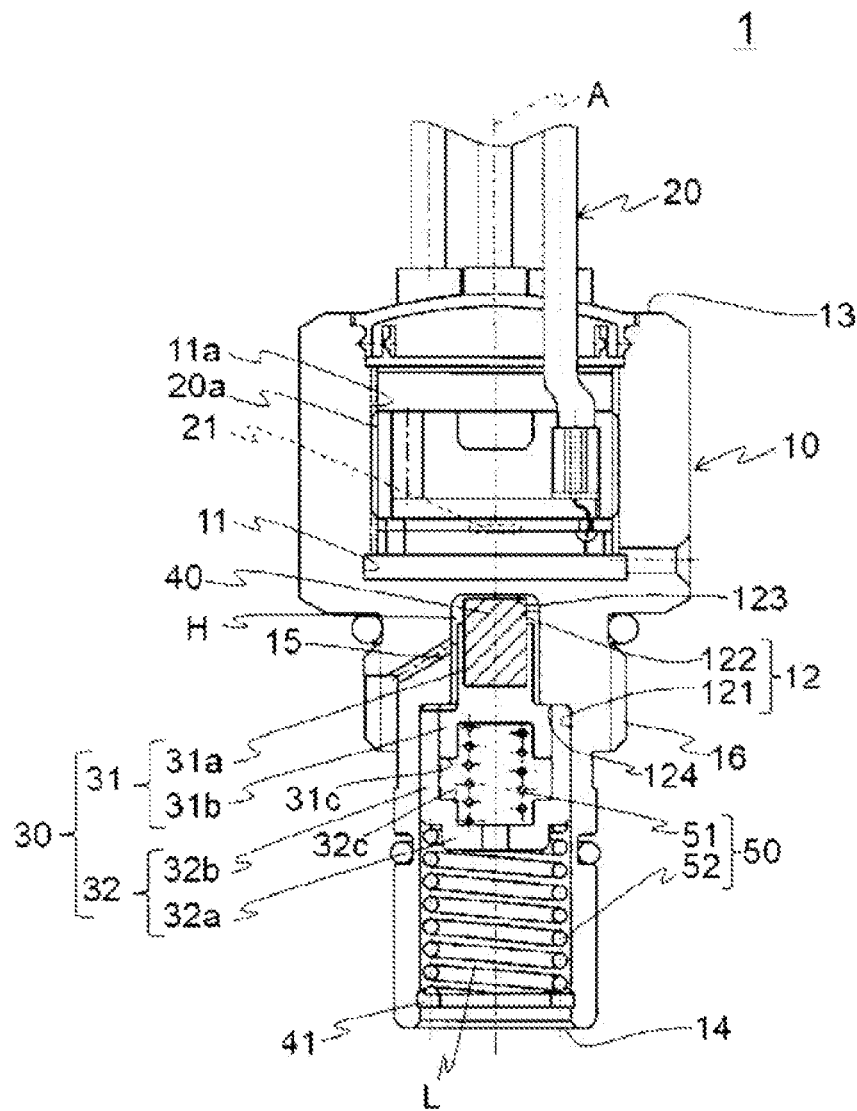
FIG. 2 is a cross-sectional view of the differential pressure detection device 1.

Next, the differential pressure detection device 1 will be described in detail. FIG. 2 is a cross-sectional view of the differential pressure detection device 1. In FIG. 2, hatching that indicates a cross section is omitted as for a plurality of components.

The differential pressure detection device 1 mainly includes a case 10, a detection unit 20, a spool 30, a magnet 40, and an elastic member 50.

The case 10 has a substantially cylindrical shape, and a cavity 11 and a sliding cavity 12 are formed in both ends of the case 10, respectively. The cavity 11 and the sliding cavity 12 each have a substantially cylindrical shape.

The cavity 11 is open to an end face 13 of the case 10. The detection unit 20 is provided in the cavity 11. An internal thread portion 11*a* is formed inside the cavity 11.

The detection unit 20 has a substantially cylindrical shape, and an external thread portion 20*a* is formed around the detection unit 20. The external thread portion 20*a* is threadedly engaged with the internal thread portion 11*a*, and thus the detection unit 20 is provided inside the cavity 11 such that the height (position in the z direction) is adjustable.

A magnetic field detection element 21 is provided in a substantially center of the detection unit 20. The magnetic field detection element 21 detects a magnetic field formed by the magnet 40. The magnetic field detection element 21 can use a reed switch, a Hall element, or the like. Since the reed switch and the Hall element has been already known, description of the reed switch and the Hall element will be omitted.

The sliding cavity 12 is open to the other end face 14 of the case 10. The sliding cavity 12 mainly includes the first cavity 121 and the second cavity 122. Center axes of the first cavity 121 and the second cavity 122 substantially match a center axis A. The second cavity 122 is formed in a tip of the first cavity 121 (a back side of the sliding cavity 12).

The hole 15 is open in a side surface of the second cavity 122. The hole 15 passes through the case 10 in the radial direction, and both ends of the hole 15 are open to the side surface of the second cavity 122 and an outer peripheral surface of the case 10. Since the outer peripheral surface of the case 10 faces the space S1, the second cavity 122 and the space S1 communicates with each other via the hole 15.

The spool 30, the magnet 40, and the elastic member 50 are provided inside the sliding cavity 12. The spool 30 is provided to be movable along the center axis A of the sliding cavity 12 inside the sliding cavity 12.

The spool 30 mainly includes a first spool 31 provided with the magnet 40 and a second spool 32 provided in a side closer to the end face 14 than the first spool 31. In a state where the magnet 40 is provided, the first spool 31 is lighter than the second spool 32. In the present embodiment, the first spool 31 is approximately 2 g to approximately 4 g, and the second spool 32 is approximately 5 g to approximately 10 g.

The first spool 31 has a substantially cylindrical shape, and includes a first cylindrical portion 31*a* having a small diameter and a second cylindrical portion 31*b* having a large diameter. The first cylindrical portion 31*a* is positioned in a side closer to a bottom surface 123 than the second cylindrical portion 31*b* and is inserted inside the second cavity 122. The magnet 40 is provided in a tip (side close to the bottom surface 123) of the first cylindrical portion 31*a*.

When the first spool 31 is provided inside the sliding cavity 12, the magnet 40 is opposite to a bottom surface of the sliding cavity 12. Thus, the magnet 40 and the magnetic field detection element 21 are opposite to each other with the bottom surface 123 of the sliding cavity 12 interposed between the magnet 40 and the magnetic field detection element 21.

The second spool 32 mainly includes a plate-like portion 32*a* having a substantially circular plate shape, and a cylindrical portion 32*b* having a substantially cylindrical shape. The cylindrical portion 32*b* protrudes toward the bottom surface 123. A diameter of the cylindrical portion 32*b* is substantially identical to an inner diameter of the first cavity 121, and the cylindrical portion 32*b* slides inside the first cavity 121.

The second cylindrical portion 31*b* is provided inside the cylindrical portion 32*b* and slides along an inner peripheral surface of the cylindrical portion 32*b*.

The spool 30 (the first spool 31 and the second spool 32) divides the sliding cavity 12 into two spaces, here, a space H in the high pressure side formed by the second cavity 122, the first spool 31, and the second spool 32 and a space L in the low pressure side formed by the first cavity 121 and the second spool 32. In other words, the first spool 31 is provided to face the space H in the high pressure side, and the second spool 32 is provided to face the space L in the low pressure side.

The space in the high pressure side communicates with the space S1 via the hole 15 (see FIG. 1). Additionally, the space in the low pressure side communicates with the mounting cavity 135 and the outflow path 134, that is, the space S2 via an opening of the second cavity 122 (see FIG. 1).

The elastic member 50 includes a first elastic member 51 that urges the first spool 31 toward the space H in the high pressure side (here, toward the bottom surface 123), and a second elastic member 52 that urges the second spool 32 toward the space H in the high pressure side. The first elastic member 51 and the second elastic member 52 are disposed in series.

Urging force of the first elastic member 51 is smaller than urging force of the second elastic member 52. In the present embodiment, the first elastic member 51 and the second elastic member 52 are coil springs, and a spring constant of the first elastic member 51 is smaller than a spring constant of the second elastic member 52. Additionally, a wire diameter of the first elastic member 51 is narrower than a wire diameter of the second elastic member 52.

One end of the first elastic member 51 is provided in the first spool 31, and the other end of the first elastic member 51 is provided in the second spool 32. The first elastic member 51 deforms between the first spool 31 and the second spool 32.

One end of the second elastic member 52 is provided in the second spool 32, and the other end of the second elastic member 52 is provided in a spring receiver 41. The second elastic member 52 deforms between the second spool 32 and the spring receiver 41. The spring receiver 41 is fixed to the sliding cavity 12, and the other end of the second elastic member 52 is provided in the case 10 via the spring receiver 41.

Next, an action of the differential pressure detection device 1 will be described. When pressure in the high pressure side is low, the spool 30 is pushed toward the high pressure side (side close to the bottom surface 123) by urging force of the elastic member 50, and the spool 30 is at a position closest to the bottom surface 123 as illustrated in FIG. 2. At this time, the first spool 31 and the second spool 32 abut on a flat surface 124 between the first cavity 121 and the second cavity 122.

When pressure in the space S1 increases due to clogging or the like of the filtration member 127, the spool 30 moves to the low pressure side (side close to the end face 14) against the urging force of the elastic member 50. In the present embodiment, since the first spool 31 (including the magnet 40) is lighter than the second spool 32 and the urging force of the first elastic member 51 is smaller than the urging force of the second elastic member 52, the first spool 31 first moves to a side close to the end face 14, and next the second spool 32 moves to a side close to the end face 14.

Figure 3:
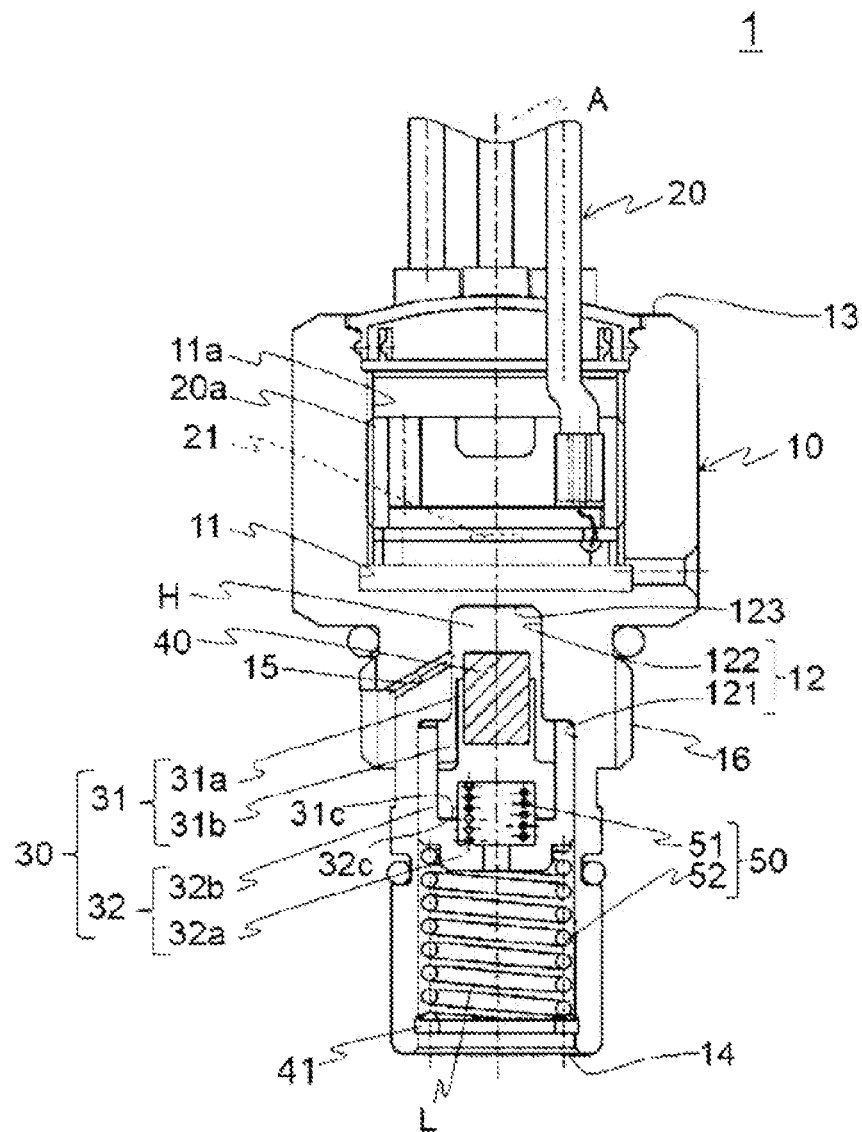
FIG. 3 is a cross-sectional view of the differential pressure detection device 1.

FIG. 3 is a view illustrating a state where the first spool 31 moves to a side close to the end face 14 against the urging force of the first elastic member 51. In FIG. 3, hatching that indicates a cross section is omitted as for a plurality of components. In the present embodiment, when differential pressure is smaller than approximately 53 kPa, only the first spool 31 moves to a side close to the end face 14. As illustrated in FIG. 3, the first spool 31 moves to a side close to the end face 14 inside the cylindrical portion 32b until an end face 31c of the second cylindrical portion 31b abuts on a stopper 32c of the second spool 32.

Figure 4:
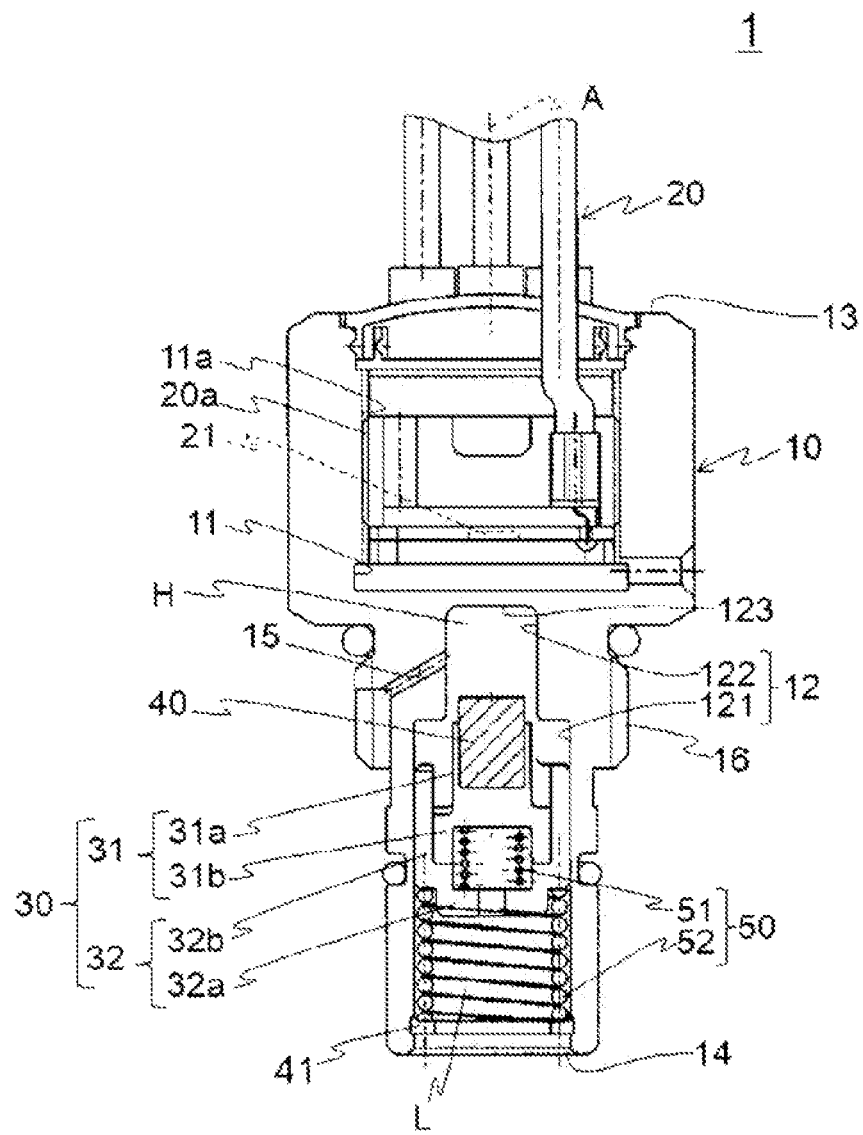
FIG. 4 is a cross-sectional view of the differential pressure detection device 1.

Subsequently, when the pressure in the space S1 further increases (in the present embodiment, differential pressure is approximately 53 kPa or greater), the first spool 31 and the second spool 32 move to a side close to the end face 14 against the urging force of the second elastic member 52. FIG. 4 is a view illustrating a state where the first spool 31 and the second spool 32 move to a side close to the end face 14 against the urging force of the second elastic member 52. In FIG. 4, hatching that indicates a cross section is omitted as for a plurality of components. Since the end face 31c abuts on the stopper 32c, the first spool 31 and the second spool 32 move together to a side close to the end face 14.

According to the present embodiment, the spool 30 is divided into the first spool 31 and the second spool 32, and the first spool 31 is made lightweight and the urging force of the first elastic member 51 is reduced. Thus, a differential pressure measurement range can be widened.

For example, when the differential pressure detection device 1 is provided inside construction machinery, since maximum acceleration of about 10 G is applied to the construction machinery, to prevent malfunction of the differential pressure detection device 1, it is necessary for the elastic member 50 to urge the spool by force to the extent that the spool 30 does not move even though the acceleration of about 10 G is applied.

For example, in a differential pressure detection device of the related art provided with one spool and one elastic member, when the weight of the spool is approximately 10 g, to prevent malfunction, it is necessary for the elastic member to urge the spool by force of approximately 100 g. For example, when the pressure receiving area of the spool is 1 cm$^2$, minimum measurement differential pressure is 10 kPa (100 g/1 cm$^2$=10 kPa), and it is difficult to measure differential pressure during low differential pressure.

In contrast, in the present embodiment, since the spool 30 is divided into the first spool 31 and the second spool 32 and the first spool 31 is made lightweight, differential pressure can be measured even during low differential pressure. For example, when the first spool 31 is approximately 3 g, to prevent malfunction, the first elastic member 51 may urge the first spool 31 by force of approximately 30 g. Additionally, when the pressure receiving area of the spool is 1 cm$^2$, minimum measurement differential pressure is 3 kPa (30 g/1 cm$^2$=3 kPa), and differential pressure can be measured even during low differential pressure.

Additionally, according to the present embodiment, the first spool 31 is provided inside the second spool 32, and thus the first spool 31 is further miniaturized and made lightweight, and differential pressure can be measured accurately even when differential pressure is small.

Note that in the present embodiment, the elastic member 50 (the first elastic member 51 and the second elastic member 52) is the coil spring, but the elastic member is not limited to the coil spring as long as the first elastic member 51 urges the first spool 31 toward the bottom surface 123 and the second elastic member 52 urges the second spool 32 toward the bottom surface 123. For example, a diaphragm may be used for the elastic member.

Second Embodiment

Hereinafter, a differential pressure detection device 2 according to a second embodiment will be described. Note that the same components as those in the first embodiment will be denoted by the same reference signs, and descriptions of the same components will be omitted.

Figure 5:
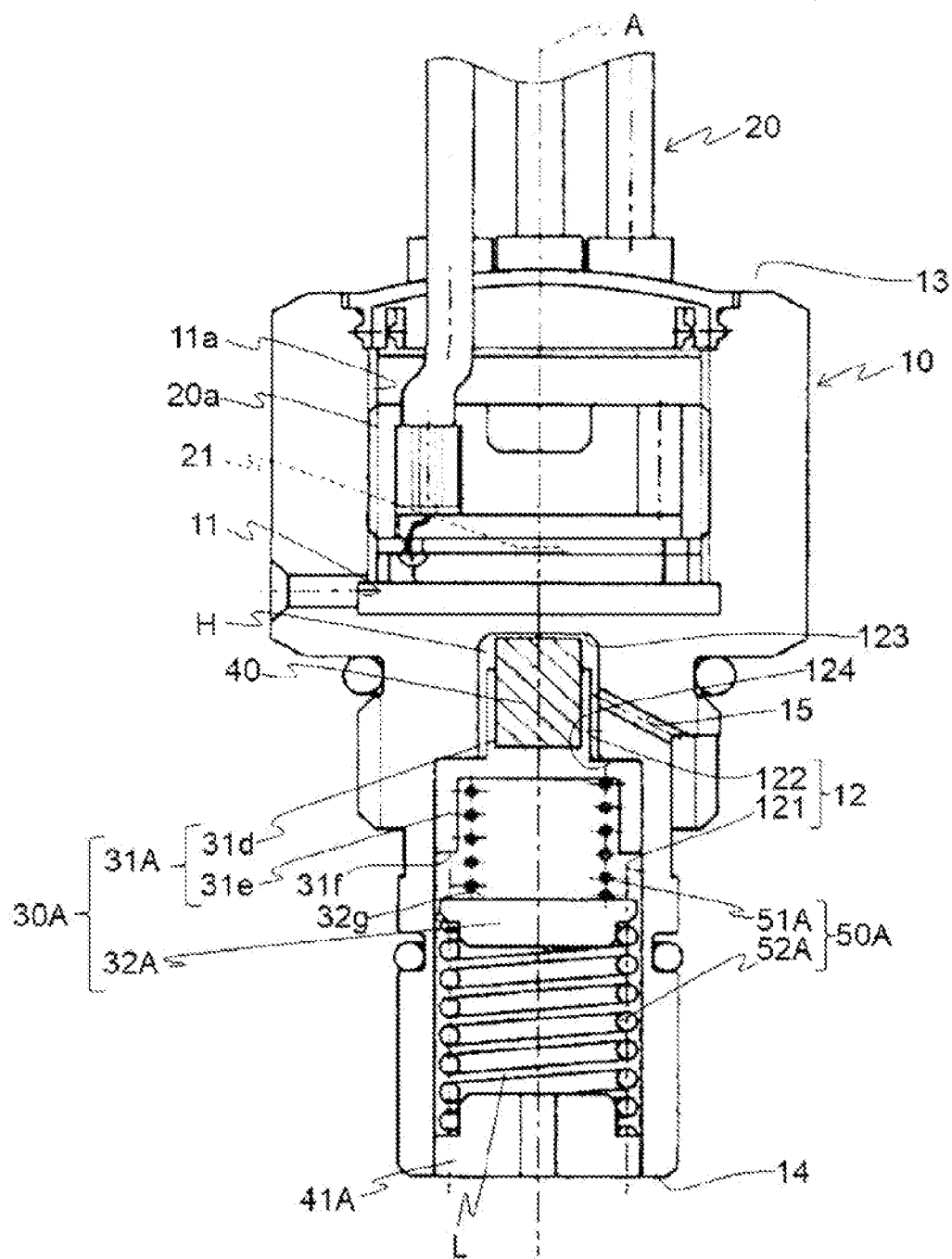
FIG. 5 is a cross-sectional view of a differential pressure detection device 2.

FIG. 5 is a cross-sectional view of the differential pressure detection device 2. In FIG. 5, hatching that indicates a cross section is omitted as for a plurality of components. The differential pressure detection device 2 mainly includes a case 10, a detection unit 20, a spool 30A, a magnet 40, and an elastic member 50A.

The spool 30A mainly includes a first spool 31A provided with the magnet 40 and a second spool 32A provided in a side closer to an end face 14 than a first spool 31A.

The first spool 31A includes a first cylindrical portion 31d having a substantially cylindrical shape and a small diameter, and a second cylindrical portion 31e having a large diameter. The first cylindrical portion 31d is positioned in a side closer to a bottom surface 123 than the second cylindrical portion 31e and is inserted inside a second cavity 122. The magnet 40 is provided in a tip (side close to the bottom surface 123) of the first cylindrical portion 31d. A diameter of the second cylindrical portion 31e is substantially identical to an inner diameter of a first cavity 121, and the second cylindrical portion 31e slides inside the first cavity 121.

The second spool 32A is a member having a substantially circular plate shape. A diameter of a cylindrical portion 32b is substantially identical to the inner diameter of the first cavity 121 and slides inside the first cavity 121.

The spool 30A (the first spool 31A and the second spool 32A) divides a sliding cavity 12 into two spaces, here, a space H in a high pressure side formed by the second cavity 122 and the first spool 31A and a space L in a low pressure side formed by the first cavity 121 and the second spool 32A. In other words, the first spool 31A is provided to face the space H in the high pressure side, and the second spool 32A is provided to face the space L in the low pressure side.

The elastic member 50A includes a first elastic member 51A that urges the first spool 31A toward the space H in the high pressure side, and a second elastic member 52A that urges the second spool 32A toward the space H in the high pressure side. The first elastic member 51A and the second elastic member 52A are disposed in series. Urging force of the first elastic member 51A is smaller than urging force of the second elastic member 52A.

One end of the first elastic member 51A is provided in the first spool 31A, and the other end of the first elastic member 51A is provided in the second spool 32A. The first elastic member 51A deforms between the first spool 31A and the second spool 32A.

One end of the second elastic member 52A is provided in the second spool 32A, and the other end of the second elastic member 52A is provided in a spring receiver 41A. The second elastic member 52A deforms between the second spool 32A and the spring receiver 41A. Note that shapes of the spring receiver 41 and the spring receiver 41A are different.

Next, an action of the differential pressure detection device 2 will be described. When pressure in the high pressure side is low, the spool 30A is pushed toward the space H in the high pressure side by urging force of the elastic member 50A, and the spool 30A is at a position closest to the bottom surface 123 as illustrated in FIG. 5. At this time, the first spool 31A abuts on a flat surface 124.

Since the urging force of the first elastic member 51A is smaller than the urging force of the second elastic member 52A, when pressure in a space S1 increases, the first spool 31A first moves to a side close to the end face 14, and next the second spool 32A moves to a side close to the end face 14.

The first spool 31A moves to a side close to the end face 14 inside the second cavity 122 until an end face 31f of the second cylindrical portion 31e abuts on a surface 32g of a second spool 32A. Subsequently, when the pressure in the space S1 further increases, the first spool 31A and the second spool 32A move together to a side close to the end face 14 against the urging force of the second elastic member 52A.

According to the present embodiment, since the diameter of the second cylindrical portion 31e is substantially identical to the inner diameter of the first cavity 121, the pressure receiving area of the first spool 31A can be increased. For example, when the first spool 31A (including the magnet 40) is approximately 3 g and the pressure receiving area of the spool is 1 cm$^2$, minimum measurement differential pressure is 3 kPa (30 g/1 cm$^2$=3 kPa), but when the pressure receiving area of the spool is 2 cm$^2$, minimum measurement differential pressure is reduced to be 1.5 kPa (30 g/2 cm$^2$=1.5 kPa). In this way, the spool 30A is divided into two spaces and the first spool 31A is made light, and the pressure receiving area of the first spool 31A is increased. Thus, a differential pressure measurement range is widened, and measurement of lower differential pressure can be performed.

Third Embodiment

Hereinafter, a differential pressure detection device 3 according to a third embodiment will be described. Note that the same components as those in the first and second embodiments will be denoted by the same reference signs, and descriptions of the same components will be omitted.

Figure 6:
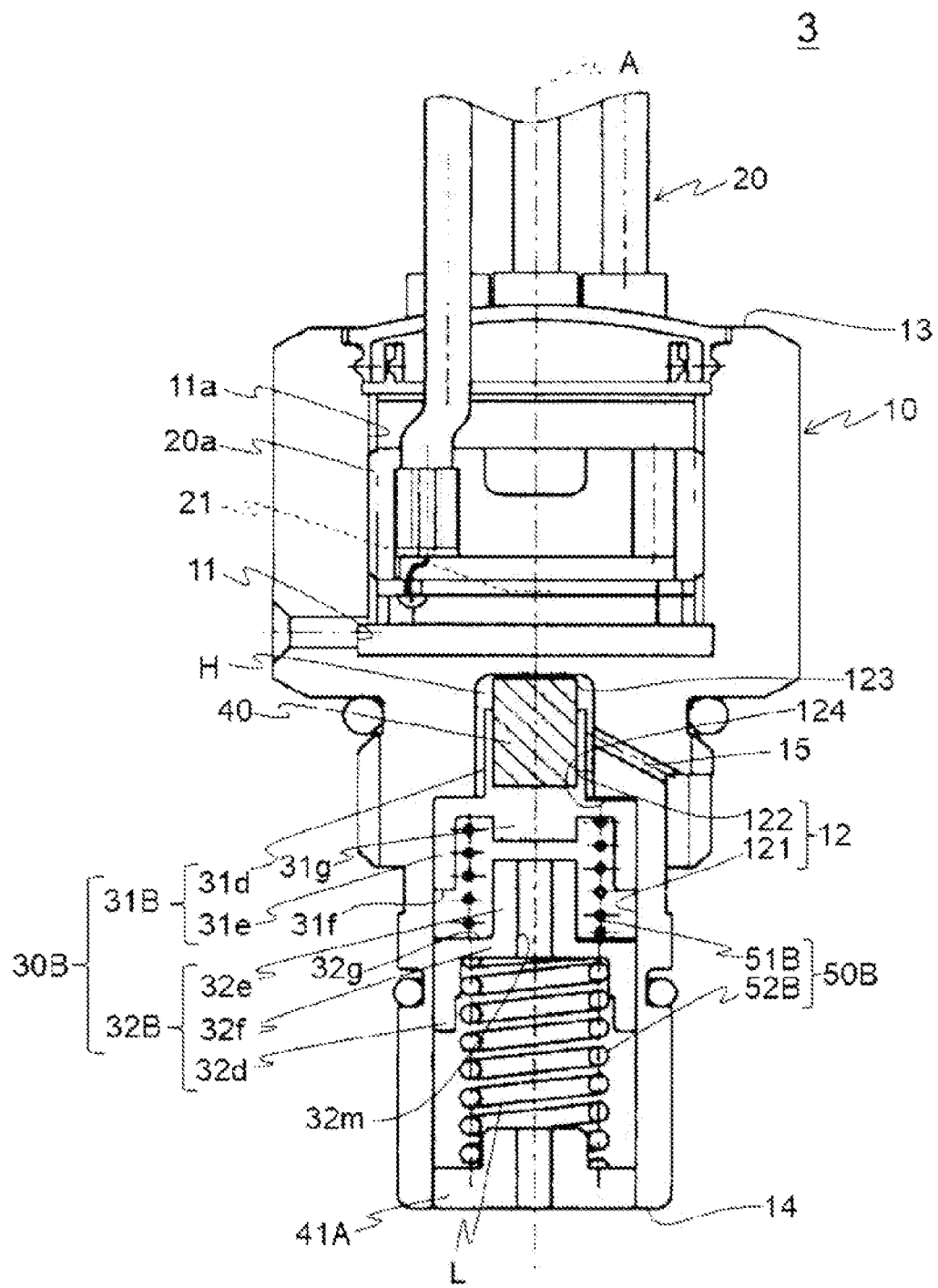
FIG. 6 is a cross-sectional view of a differential pressure detection device 3.

FIG. 6 is a cross-sectional view of the differential pressure detection device 3. In FIG. 6, hatching that indicates a cross section is omitted as for a plurality of components. The differential pressure detection device 3 mainly includes a case 10, a detection unit 20, a spool 30B, a magnet 40, and an elastic member 50B.

The spool 30B mainly includes a first spool 31B provided with the magnet 40 and a second spool 32B provided in a side closer to an end face 14 than a first spool 31B. In a state where the magnet 40 is provided, the first spool 31B is lighter than the second spool 32B.

The first spool 31B has a substantially cylindrical shape, and includes a first cylindrical portion 31d having a small diameter, a second cylindrical portion 31e having a large diameter, and a protrusion portion 31g. The protrusion portion 31g is provided in a surface of a side close to the end face 14 of the first cylindrical portion 31d, and protrudes toward the end face 14.

The second spool 32B includes a first cylindrical portion 32d having a substantially cylindrical shape and a large diameter, a second cylindrical portion 32e having a small diameter, and a plate-like portion 32f provided between the first cylindrical portion 32d and the second cylindrical portion 32e. Diameters of the second cylindrical portion 32e and the plate-like portion 32f are substantially identical to an inner diameter of a first cavity 121, and the second cylindrical portion 32e and the plate-like portion 32f slide inside the first cavity 121. The first cylindrical portion 32d is provided in a surface 32g of a side close to a bottom surface 123 of the plate-like portion 32f, and protrudes toward the bottom surface 123.

The spool 30B (the first spool 31B and the second spool 32B) divides a sliding cavity 12 into two spaces, here, a space H in a high pressure side formed by a second cavity 122 and the first spool 31B and a space L in a low pressure side formed by the first cavity 121 and the second spool 32B. In other words, the first spool 31B is provided to face the space H in the high pressure side, and the second spool 32B is provided to face the space L in the low pressure side.

The elastic member 50B includes a first elastic member 51B that urges the first spool 31B toward the space H in the high pressure side, and a second elastic member 52B that urges the second spool 32B toward the space H in the high pressure side. The first elastic member 51B and the second elastic member 52B are disposed in series. Urging force of the first elastic member 51B is smaller than urging force of the second elastic member 52B.

One end of the first elastic member 51B is provided in the first spool 31B, and the other end of the first elastic member 51B is provided in the second spool 32B. A first elastic member 51B deforms between the first spool 31B and the second spool 32B.

One end of the second elastic member 52B is provided in the second spool 32B, and the other end of the second elastic member 52B is provided in a spring receiver 41A. A second elastic member 52B deforms between the second spool 32B and the spring receiver 41A.

Next, an action of the differential pressure detection device 3 will be described. When pressure in the high pressure side is low, the spool 30B is pushed toward the space H in the high pressure side by urging force of the elastic member 50B, and the spool 30B is at a position closest to the bottom surface 123 as illustrated in FIG. 6. At this time, the first spool 31B abuts on a flat surface 124.

Since the first spool 31B (including the magnet 40) is lighter than the second spool 32B and the urging force of the first elastic member 51B is smaller than the urging force of the second elastic member 52B, when pressure in a space S1 increases, the first spool 31B first moves to a side close to the end face 14, and next the second spool 32B moves to a side close to the end face 14.

The first spool 31B moves to a side close to the end face 14 inside the second cavity 122 until an end face 31f of the second cylindrical portion 31e abuts on the surface 32g of a second spool 32B. At this time, the protrusion portion 31g covers a hole 32m formed in the second spool 32B. Subsequently, when the pressure in the space S1 further increases, the first spool 31B and the second spool 32B move together to a side close to the end face 14 against the urging force of the second elastic member 52B.

According to the present embodiment, since the diameter of the second cylindrical portion 31e is substantially identical to the inner diameter of the first cavity 121, the pressure receiving area of the first spool 31B is increased, a differential pressure measurement range is widened, and differential pressure can be measured particularly during low differential pressure. Additionally, according to the present embodiment, when the first spool 31B and the second spool 32B move to a side close to the end face 14, the protrusion portion 31g covers the hole 32m formed in the second spool 32B, and thus the first spool 31B and the second spool 32B can move smoothly within the second cavity 122.

Fourth Embodiment

Hereinafter, a differential pressure detection device 4 according to a fourth embodiment will be described. Note that the same components as those in the first to third embodiments will be denoted by the same reference signs, and descriptions of the same components will be omitted.

Figure 7:
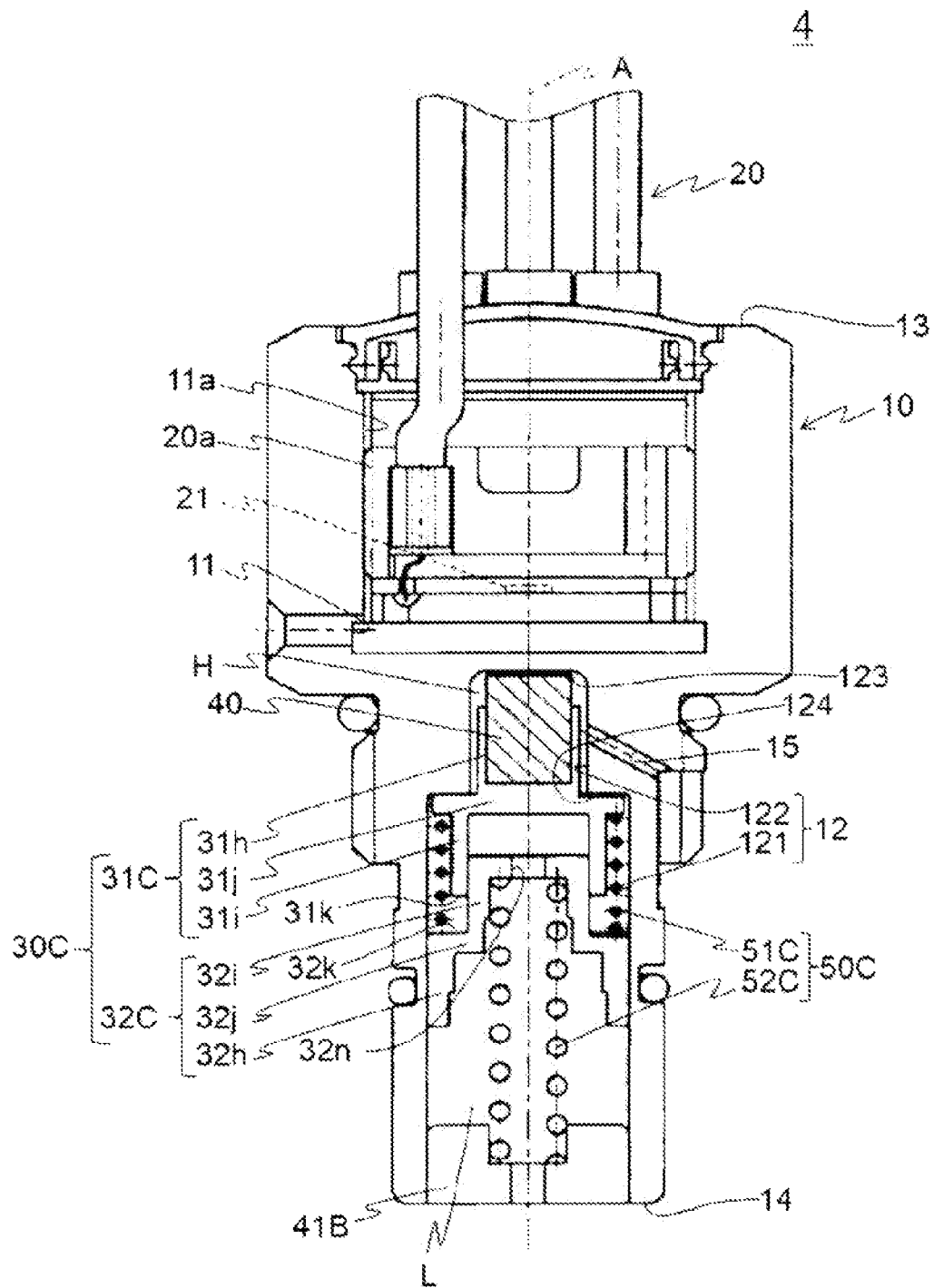
FIG. 7 is a cross-sectional view of a differential pressure detection device 4.

FIG. 7 is a cross-sectional view of the differential pressure detection device 4. In FIG. 7, hatching that indicates a cross section is omitted as for a plurality of components. The differential pressure detection device 4 mainly includes a case 10, a detection unit 20, a spool 30C, a magnet 40, and an elastic member 50C.

The spool 30C mainly includes a first spool 31C provided with the magnet 40 and a second spool 32C provided in a side closer to an end face 14 than a first spool 31C. In a state where the magnet 40 is provided, the first spool 31C is lighter than the second spool 32C.

The first spool 31C includes a first cylindrical portion 31h having a substantially cylindrical shape and a small diameter, a second cylindrical portion 31i having a large diameter, and a plate-like portion 31j provided between the first cylindrical portion 31h and the second cylindrical portion 31i. A diameter of the plate-like portion 31j is substantially identical to an inner diameter of a first cavity 121.

A second spool 32C includes a first cylindrical portion 32h having a substantially cylindrical shape and a large diameter, a second cylindrical portion 32i having a small diameter, and a plate-like portion 32j provided between the first cylindrical portion 32h and the second cylindrical portion 32i. Diameters of the first cylindrical portion 32h and the plate-like portion 32j are substantially identical to the inner diameter of the first cavity 121, and the first cylindrical portion 32h and the plate-like portion 32j slide inside the first cavity 121. The second cylindrical portion 32i is provided in a surface of a side close to a bottom surface 123 of the plate-like portion 32j, and protrudes toward the bottom surface 123. The second cylindrical portion 31i slides outside the second cylindrical portion 32i.

The spool 30C (the first spool 31C and the second spool 32C) divides a sliding cavity 12 into two spaces, here, a space H in a high pressure side formed by a second cavity 122 and the first spool 31C and a space L in a low pressure side formed by the first cavity 121 and the second spool 32C. In other words, the first spool 31C is provided to face the space H in the high pressure side, and the second spool 32C is provided to face the space L in the low pressure side.

The elastic member 50C includes a first elastic member 51C that urges the first spool 31C toward the space H in the high pressure side, and a second elastic member 52C that urges the second spool 32C toward the space H in the high pressure side. The first elastic member 51C and the second elastic member 52C are disposed in series. Urging force of the first elastic member 51C is smaller than urging force of the second elastic member 52C.

One end of the first elastic member 51C is provided in the first spool 31C, and the other end of the first elastic member 51C is provided in the second spool 32C. The first elastic member 51C deforms between the first spool 31C and the second spool 32C.

One end of the second elastic member 52C is provided in the second spool 32C, and the other end of the second elastic member 52C is provided in a spring receiver 41B. A second elastic member 52C deforms between the second spool 32C and the spring receiver 41B. Note that shapes of the spring receiver 41 and the spring receiver 41B are different.

Next, an action of the differential pressure detection device 4 will be described. When pressure in the high pressure side is low, the spool 30C is pushed toward the space H in the high pressure side by urging force of an elastic member 50C, and the spool 30C is at a position closest to the bottom surface 123 as illustrated in FIG. 7. At this time, a first spool 31C abuts on a flat surface 124.

Since the first spool 31C (including the magnet 40) is lighter than the second spool 32C and the urging force of the first elastic member 51C is smaller than the urging force of the second elastic member 52C, when pressure in a space S1 increases, the first spool 31C first moves to a side close to the end face 14, and next the second spool 32C moves to a side close to the end face 14.

The first spool 31C moves to a side close to the end face 14 inside the second cavity 122 until an end face 31k abuts on a surface 32k of a second spool 32C. At this time, the plate-like portion 31j covers a hole 32n formed in the second spool 32C. Subsequently, when the pressure of the space S1 further increases, a first spool 31C and a second spool 32C move together to a side close to the end face 14 against urging force of a second elastic member 52C.

According to the present embodiment, the pressure receiving area of the first spool 31C is increased, a differential pressure measurement range is widened, and differential pressure can be measured particularly during low differential pressure. Additionally, according to the present embodiment, when the first spool 31C and the second spool 32C moves to a side close to the end face 14, the plate-like portion 31j covers the hole 32n formed in the second spool 32C, and thus the first spool 31C and the second spool 32C can move smoothly within the second cavity 122.

Fifth Embodiment

Hereinafter, a differential pressure detection device 5 according to a fifth embodiment will be described. Unlike the differential pressure detection devices 1 to 4, the differential pressure detection device 5 includes three spools and three elastic members. Note that the same components as those in the first to fourth embodiments will be denoted by the same reference signs, and descriptions of the same components will be omitted.

Figure 8:
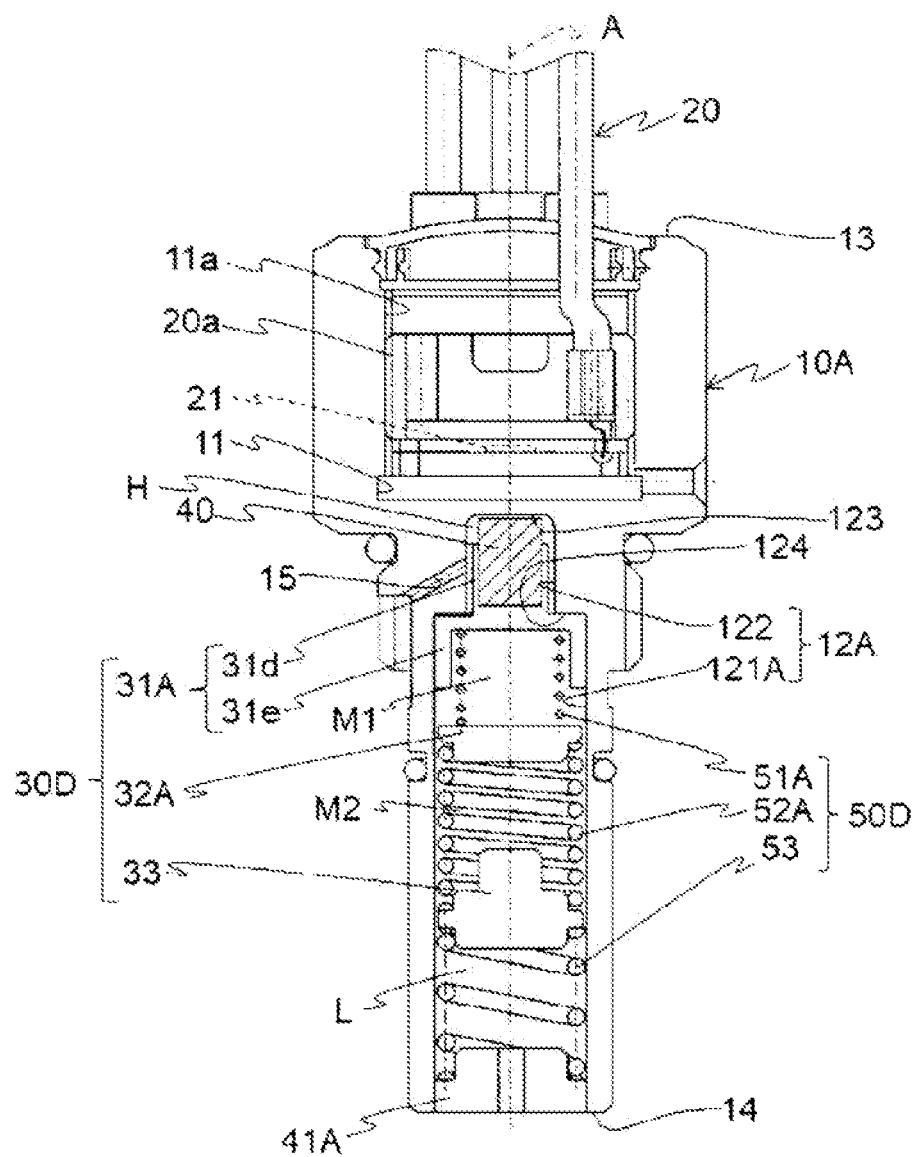
FIG. 8 is a cross-sectional view of a differential pressure detection device 5.

FIG. 8 is a cross-sectional view of the differential pressure detection device 5. In FIG. 8, hatching that indicates a cross section is omitted as for a plurality of components. The differential pressure detection device 5 mainly includes a case 10A, a detection unit 20, a spool 30D, a magnet 40, and an elastic member 50D.

Lengths of the case 10 and the case 10A are different, depths of the sliding cavity 12 and a sliding cavity 12A are different, and depths of the first cavity 121 and a first cavity 121A are different.

The spool 30D mainly includes a first spool 31A provided with the magnet 40, a second spool 32A provided in a side closer to an end face 14 than the first spool 31A, and a third spool 33 provided in a side closer to the end face 14 than the second spool 32A.

The third spool 33 is a member having a substantially circular plate shape. A diameter of the third spool 33 is substantially identical to an inner diameter of the first cavity 121A, and the third spool 33 slides inside the first cavity 121A.

A spool 30D (the first spool 31A, the second spool 32A, and the third spool 33) divides the sliding cavity 12A into three spaces, here, a space H in a high pressure side formed by a second cavity 122 and the first spool 31A, intermediate spaces M1 and M2 formed by a first cavity 121A and the second spool 32A, and a space L in a low pressure side formed by the first cavity 121A and the third spool 33. The third spool 33 is provided to face the intermediate spaces M1 and M2.

The elastic member 50D includes a first elastic member 51A that urges the first spool 31A toward a bottom surface 123, a second elastic member 52A that urges the second spool 32A toward the bottom surface 123, and a third elastic member 53 that urges the third spool 33 toward the bottom surface 123. The first elastic member 51A, the second elastic member 52A, and the third elastic member 53 are disposed in series. Urging force of the first elastic member 51A is smaller than urging force of the second elastic member 52A, and the urging force of the second elastic member 52A is smaller than urging force of the third elastic member 53.

One end of the second elastic member 52A is provided in the second spool 32A, and the other end of the second elastic member 52A is provided in the third spool 33. The second elastic member 52A deforms between the second spool 32A and the third spool 33.

One end of the third elastic member 53 is provided in the third spool 33, and the other end of the third elastic member 53 is provided in a spring receiver 41A. The third elastic member 53 deforms between the third spool 33 and the spring receiver 41A.

Next, an action of the differential pressure detection device 5 will be described. When pressure in the high pressure side is low, the spool 30D is pushed toward a side close to the bottom surface 123 by urging force of an elastic member 50D. As illustrated in FIG. 8, the first spool 31A abuts on a flat surface 124 and is at a position closest to the bottom surface 123.

When pressure in a space S1 increases, the first spool 31A first moves to a side close to the end face 14, and next the second spool 32A moves to a side close to the end face 14. Subsequently, when the pressure in the space S1 further increases, the first spool 31A, the second spool 32A, and the third spool 33 move together to a side close to the end face 14 against the urging force of the third elastic member 53.

According to the present embodiment, the spool 30D and the elastic member 50D can further be formed in multiple stages. Accordingly, a differential pressure measurement range can further be widened. For example, the first spool 31A is further made lightweight and the urging force of the first elastic member 51A is further reduced, and thus, differential pressure can be measured accurately during low differential pressure.

The embodiments of the invention are described above in detail with reference to the drawings. However, specific configurations are not limited to the embodiments and also include changes in design or the like without departing from the gist of the invention. A person skilled in the art can appropriately change, add, and convert each element in the embodiments.

Figure 9:
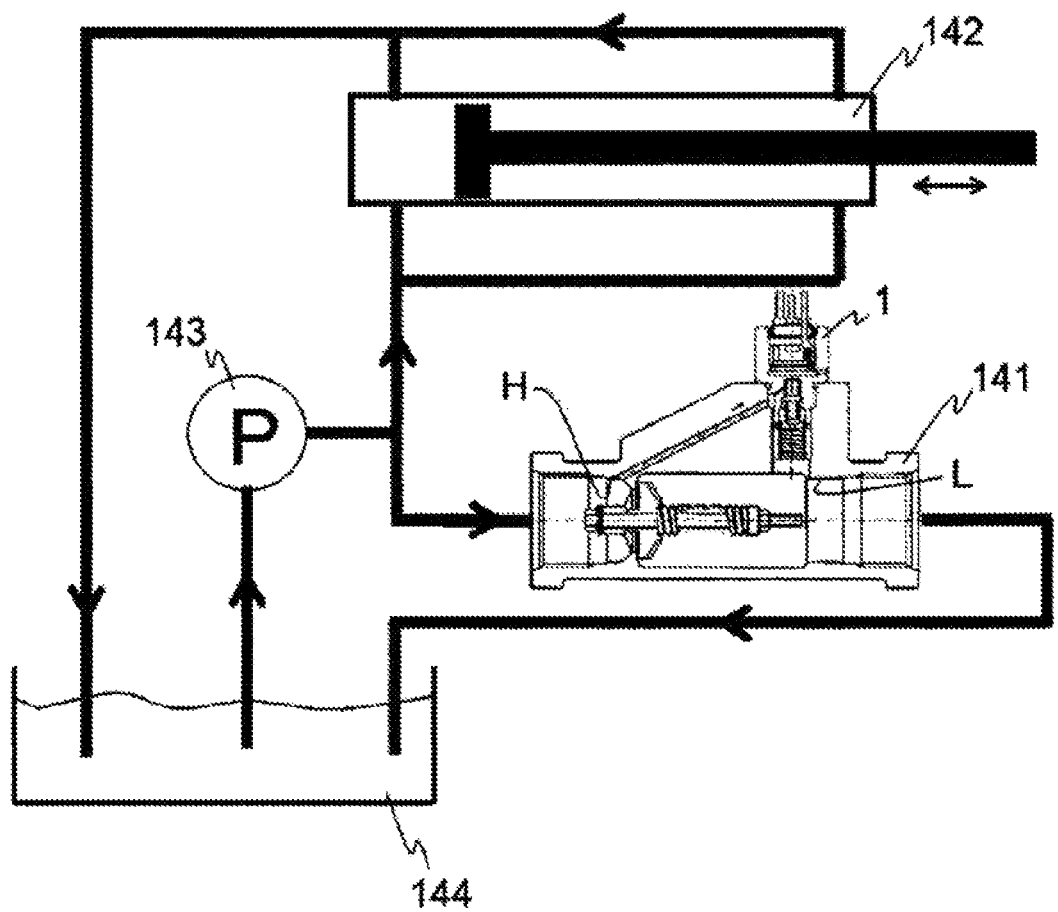
FIG. 9 is a schematic view illustrating a form in which the differential pressure detection device 1 is provided in a pressure control valve 141 in a hydraulic circuit 101.

For example, although in the first to fifth embodiments, the differential pressure detection devices 1 to 5 are each provided in the filtration device 100, a device provided with the differential pressure detection device is not limited to the filtration device. FIG. 9 is a schematic view illustrating a form in which the differential pressure detection device 1 is provided in a pressure control valve 141 in a hydraulic circuit 101. An arrow in FIG. 9 indicates the direction in which oil flows. In the hydraulic circuit 101, oil flows to an actuator 102 by a pump 143, and an actuator 142 is driven. However, the pressure control valve 141 is provided such that excessive pressure is not applied to the actuator 142. Additionally, the pressure control valve 141 returns oil to a tank 144 when the actuator 142 does not use oil. The differential pressure detection device 1 is provided in the pressure control valve 141 and differential pressure between a space H in a high pressure side and a space L in a low pressure side is detected, and thus pressure applied to the actuator 142 can be monitored. For example, a decrease of hydraulic pressure due to deterioration or the like of the pump 143 or a decrease or an increase of hydraulic pressure due to failure of the pressure control valve 141 can be monitored.

Additionally, in the present invention, "substantially" is a concept not only including the case of being strictly the same, but also including an error and deformation to the extent that a loss of identity does not occur. For example, "substantially parallel" is not limited to the case of being strictly parallel, and is, for example, a concept including some errors. Additionally, for example, the case of expressing "parallel", "orthogonal", "matching", and the like includes not only the case of being strictly parallel, orthogonal, matching, and the like, but also the case of being substantially parallel, substantially orthogonal, substantially matching, and the like. Additionally, in the present invention, "vicinity" means to include a region in a certain range (the range can be determined arbitrarily) near a reference position. For example, the case of expressing "in the vicinity of A" is a concept that a region in a certain range near A may include A or may not include A.

REFERENCE SIGNS LIST 1, 2, 3, 4, 5: Differential Pressure detection device
10: Case
11: Cavity
11a: Internal thread portion
12: Sliding cavity
13, 14: End face
15: Hole
16: External thread portion
20: Detection unit
20a: External thread portion
21: Magnetic field detection element
30, 30A, 30B, 30C, 30D: Spool
31, 31A, 31B, 31C: First spool
31a, 31d, 31h: First cylindrical portion
31b, 31e, 31i: Second cylindrical portion
31c, 31f: End face
31g: Protrusion portion
31j: Plate-like portion
31k: End face
32, 32A, 32B, 32C: Second spool
32a: Plate-like portion
32b: Cylindrical portion
32c: Stopper
32d, 32h: First cylindrical portion
32e, 32i: Second cylindrical portion
32f, 32j: Plate-like portion
32g, 32k: Surface
32m, 32n: Hole
33: Third spool
40: Magnet
41, 41A, 41B: Spring receiver
50, 50A, 50B, 50C, 50D: Elastic member
51, 51A, 51B, 51C: First elastic member
52, 52A, 52B, 52C: Second elastic member
53: Third elastic member
100: Filtration device
101: Hydraulic circuit
102: Actuator
110: Housing
110a: Internal thread portion
111: Drain
112, 113, 114, 115: Sealing Member
120: Filter element
121: First cavity
122: Second cavity
123: Bottom surface
123a: Hollow portion
124: Flat surface
126: Inner tube
127: Filtration member
128, 129: Plate
130: Head
131: Body
131a: External thread portion
132: Central tube
132a: Stepped portion
133: Inflow path
134: Outflow path
135: Mounting cavity
135a: Internal thread portion
136: Hole
141: Pressure control valve
142: Actuator
143: Pump
144: Tank

The invention claimed is:

1. A differential pressure detection device configured to detect differential pressure that is a pressure difference between a high pressure side and a low pressure side, the differential pressure detection device comprising:
   a case having a cylindrical shape and including a sliding cavity open to a first end that is one end face;
   a spool provided inside the sliding cavity, the spool being movable along a center axis of the sliding cavity inside the sliding cavity and dividing the sliding cavity into a space in the low pressure side and a space in the high pressure side;
   an elastic member provided inside the sliding cavity; and
   a magnetic field detection element provided inside the case,
   wherein the spool includes a first spool provided with a magnet, and a second spool having a diameter identical to an inner diameter of the sliding cavity and sliding inside the sliding cavity,
   the first spool is provided to face the space in the high pressure side, and the second spool is provided to face the space in the low pressure side,
   the elastic member includes a first elastic member provided in the first spool and configured to urge the first spool toward the space in the high pressure side, and a second elastic member provided in the second spool and configured to urge the second spool toward the space in the high pressure side,
   the magnetic field detection element is provided opposite to the magnet with a bottom surface of the sliding cavity interposed between the magnetic field detection element and the magnet,
   the first spool is lighter than the second spool in a state where the magnet is provided,
   urging force of the first elastic member is smaller than urging force of the second elastic member, and
   the first elastic member and the second elastic member are disposed in series.

2. The differential pressure detection device according to claim 1,
   wherein a diameter of the first spool is identical to the inner diameter of the sliding cavity, and
   the first spool slides inside the sliding cavity.

3. The differential pressure detection device according to claim 1,
   wherein the second spool includes a stopper configured to restrict movement of the first spool in a direction toward the first end,
   the second spool includes a hole passing through the second spool along the center axis, and
   the first spool covers the hole in a state where the first spool abuts on the stopper.

4. The differential pressure detection device according to claim 1,
   wherein the second spool includes a cylindrical portion having a cylindrical shape and including an outer peripheral surface sliding with the sliding cavity,
   the cylindrical portion protrudes toward the bottom surface, and the first spool is provided inside the cylindrical portion, and slides along an inner peripheral surface of the cylindrical portion.

5. The differential pressure detection device according to claim 1,
wherein the spool further includes a third spool provided between the first spool and the second spool,
the spool divides the sliding cavity into a space in the low pressure side, a space in the high pressure side, and a space between the space in the low pressure side and the space in the high pressure side,
the elastic member further includes a third elastic member provided in the third spool and configured to urge the third spool toward the space in the high pressure side, and
urging force of the third elastic member is smaller than the urging force of the second elastic member.

6. The differential pressure detection device according to claim 2,
wherein the second spool includes a stopper configured to restrict movement of the first spool in a direction toward the first end,
the second spool includes a hole passing through the second spool along the center axis, and
the first spool covers the hole in a state where the first spool abuts on the stopper.

7. The differential pressure detection device according to claim 2,
wherein the second spool includes a cylindrical portion having a cylindrical shape and including an outer peripheral surface sliding with the sliding cavity,
the cylindrical portion protrudes toward the bottom surface, and
the first spool is provided inside the cylindrical portion, and slides along an inner peripheral surface of the cylindrical portion.

8. The differential pressure detection device according to claim 3,
wherein the second spool includes a cylindrical portion having a cylindrical shape and including an outer peripheral surface sliding with the sliding cavity,
the cylindrical portion protrudes toward the bottom surface, and
the first spool is provided inside the cylindrical portion, and slides along an inner peripheral surface of the cylindrical portion.

9. The differential pressure detection device according to claim 2,
wherein the spool further includes a third spool provided between the first spool and the second spool,
the spool divides the sliding cavity into a space in the low pressure side, a space in the high pressure side, and a space between the space in the low pressure side and the space in the high pressure side,
the elastic member further includes a third elastic member provided in the third spool and configured to urge the third spool toward the space in the high pressure side, and
urging force of the third elastic member is smaller than the urging force of the second elastic member.

10. The differential pressure detection device according to claim 3,
wherein the spool further includes a third spool provided between the first spool and the second spool,
the spool divides the sliding cavity into a space in the low pressure side, a space in the high pressure side, and a space between the space in the low pressure side and the space in the high pressure side,
the elastic member further includes a third elastic member provided in the third spool and configured to urge the third spool toward the space in the high pressure side, and
urging force of the third elastic member is smaller than the urging force of the second elastic member.

11. The differential pressure detection device according to claim 4,
wherein the spool further includes a third spool provided between the first spool and the second spool,
the spool divides the sliding cavity into a space in the low pressure side, a space in the high pressure side, and a space between the space in the low pressure side and the space in the high pressure side,
the elastic member further includes a third elastic member provided in the third spool and configured to urge the third spool toward the space in the high pressure side, and
urging force of the third elastic member is smaller than the urging force of the second elastic member.

* * * * *